United States Patent
Fong et al.

(10) Patent No.: US 11,763,258 B2
(45) Date of Patent: Sep. 19, 2023

(54) WORKFLOWS FOR DOCUMENTS

(71) Applicant: Slack Technologies, LLC, San Francisco, CA (US)

(72) Inventors: Andrew Fong, Menlo Park, CA (US); Michael Hahn, San Francisco, CA (US); Michael Brevoort, Littleton, CA (US); Chaitanya Ravula, San Francisco, CA (US); Sohom Paul, Sugarland, TX (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 17/564,506

(22) Filed: Dec. 29, 2021

(65) Prior Publication Data

US 2023/0206179 A1 Jun. 29, 2023

(51) Int. Cl.
*G06F 16/93* (2019.01)
*G06F 40/166* (2020.01)
*G06Q 10/10* (2023.01)
*G06Q 10/101* (2023.01)
*G06F 21/62* (2013.01)

(52) U.S. Cl.
CPC .......... *G06Q 10/101* (2013.01); *G06F 16/93* (2019.01); *G06F 21/6209* (2013.01); *G06Q 10/103* (2013.01); *G06F 2221/2147* (2013.01)

(58) Field of Classification Search
CPC .... G06Q 10/101; G06Q 10/103; G06F 16/93; G06F 21/6209; G06F 2221/2147
USPC .......................................... 707/301; 715/751
See application file for complete search history.

(56) References Cited

U.S. PATENT DOCUMENTS

| | | |
|---|---|---|
| 6,008,804 A | 12/1999 | Pommier et al. |
| 7,913,178 B2 | 3/2011 | Gould et al. |
| 8,924,844 B2 | 12/2014 | Lynch |
| 10,848,445 B1 * | 11/2020 | Willmann ............. H04L 51/046 |
| 11,301,200 B2 | 4/2022 | Zhang et al. |
| 11,374,990 B2 | 6/2022 | Lansing et al. |
| 2004/0267871 A1 | 12/2004 | Pratley et al. |
| 2005/0132281 A1 | 6/2005 | Pan et al. |
| 2005/0193325 A1 | 9/2005 | Epstein |
| 2008/0183819 A1 | 7/2008 | Gould et al. |
| 2008/0229185 A1 | 9/2008 | Lynch |

(Continued)

OTHER PUBLICATIONS

"Die, Email, Die! A Flickr Cofounder Aims to Cut Us All Some Slack", Readwriteweb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Shahid K Khan
*Assistant Examiner* — Ahamed I Nazar
(74) *Attorney, Agent, or Firm* — Erise IP, P.A.

(57) ABSTRACT

Media, methods, and systems are disclosed for generating a document from a workflow within a group-based communication system. A document may be created from a document template in response to a workflow trigger. The document may have a plurality of structured sections and a plurality of unstructured sections. Unstructured input may be received into an unstructured section and saved into the document. Structured input may be received into a structured section. Based on the structured input, a step of a workflow associated with the document may be performed and a result saved into the document.

20 Claims, 6 Drawing Sheets

(56) References Cited

U.S. PATENT DOCUMENTS

| | | | |
|---|---|---|---|
| 2009/0157811 A1* | 6/2009 | Bailor | G06F 40/166 709/204 |
| 2009/0271696 A1* | 10/2009 | Bailor | G06F 16/954 715/229 |
| 2013/0080919 A1 | 3/2013 | Kiang et al. | |
| 2014/0258972 A1 | 9/2014 | Savage et al. | |
| 2016/0315995 A1* | 10/2016 | Häusler | G06F 40/279 |
| 2017/0063749 A1 | 3/2017 | Gupta et al. | |
| 2017/0132200 A1* | 5/2017 | Noland | G06Q 10/06 |
| 2018/0157390 A1* | 6/2018 | Vas | G06F 9/4843 |
| 2018/0287982 A1 | 10/2018 | Draeger et al. | |
| 2019/0058680 A1* | 2/2019 | Rosania | H04L 51/16 |
| 2019/0098087 A1* | 3/2019 | Johnston | H04L 67/1097 |
| 2019/0102472 A1 | 4/2019 | Van Rensburg et al. | |
| 2019/0166330 A1 | 5/2019 | Ma et al. | |
| 2019/0179876 A1 | 6/2019 | Zhang et al. | |
| 2019/0253430 A1 | 8/2019 | Gamache et al. | |
| 2019/0325213 A1* | 10/2019 | Numata | G06F 40/143 |
| 2020/0090135 A1 | 3/2020 | Malcangio et al. | |
| 2020/0279070 A1 | 9/2020 | Rose et al. | |
| 2020/0348802 A1 | 11/2020 | Brito et al. | |
| 2020/0387567 A1* | 12/2020 | Loforte | G06F 16/93 |
| 2021/0150480 A1* | 5/2021 | Haramati | G06Q 10/063118 |
| 2021/0248556 A1* | 8/2021 | Venkatraman | G06F 16/1873 |
| 2021/0397402 A1 | 12/2021 | Ashkenazi et al. | |
| 2022/0078143 A1 | 3/2022 | Eirinberg et al. | |
| 2022/0086200 A1 | 3/2022 | Lansing et al. | |
| 2022/0222625 A1* | 7/2022 | Haramati | G06F 21/6218 |
| 2022/0365740 A1 | 11/2022 | Chang et al. | |

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", TEDIUM, [online][retrieved May 9, 2019], Retrieved from the Internet: <URL https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, LexisNexis, https://advancelexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Hu, Vincent C. et al.; Attribute Considerations for Access Control Systems; NIST Special Publication 800-205; U.S. Department of Commerce; pp. 1-42; https://doi.org/10.6028/NIST.SP.800-205; retrieved on Aug. 24, 2022.

United States Patent and Trademark Office, U.S. Appl. No. 17/589,692, Non-Final Office Action dated Jan. 18, 2023.

Malik et al. A Comparison of Collaborative Access Control Models, IJACSA 8:3, 2017, pp. 209-206. (2017).

United States Patent and Trademark Office, U.S. Appl. No. 17/589,822, Non-Final Office Action dated Nov. 30, 2022.

PCT Patent Application PCT/US2022/052680 International Search Report and Written Opinion of the International Search Report, dated Apr. 5, 2023.

U.S. Appl. No. 17/566,947, Non-final Office Action dated Apr. 24, 2023.

U.S. Appl. No. 17/589,822, Final Office Action dated Mar. 23, 2023.

U.S. Appl. No. 17/589,584, Non-Final Office Action dated Jan. 20, 2023.

Bertino, Elisa, et al., Specifying and enforcing access control policies for XML document sources, World Wide Web 3 (2000) 139-151.

U.S. Appl. No. 17/589,584, Notice of Allowance dated May 18, 2023.

U.S. Appl. No. 17/589,692, Final Office Action dated May 12, 2023.

* cited by examiner

WORKFLOWS FOR DOCUMENTS

TECHNICAL FIELD

Collaboration tools allow users to collaborate on documents, but the lack of structure in these tools may prevent them from being used to automate activities within an organization and dynamically process information. In contrast, workflow tools are able to automate certain functionality, but are often rigid and unable to change dynamically based on the needs of users. This can lead to wasted time and effort while users of the workflow tool wait for unnecessary steps to be completed, or are forced to find arbitrary workarounds to attempt to bypass certain workflow steps. When faced with these challenges, many users choose to simply abandon the workflow altogether. As such, there is a need for workflows associated with documents that are flexible and customizable while still allowing for useful automation which can allow users to effectively collaborate.

SUMMARY

Embodiments of the invention address the above-identified problems by providing a workflow document within a group-based communication system which can be customized and modified to allow for efficient collaboration between users with automation. The workflow document may contain both structured and unstructured sections which both allow users to freely collaborate while still providing powerful tools to automate functionality using workflows. The results of workflows can be integrated into the document as the workflows progress through steps, allowing for the document to contain knowledge of the entire process and act as an ultimate source of truth. Particular workflows or steps can be easily modified or skipped as needed and additional workflows can be dynamically added to ensure that the users and functionality necessary are involved, while any unnecessary users or functionality are not. This creates a powerful collaboration tool which allows users and organizations to work effectively and efficiently by ensuring the smooth completion of processes.

In particular, in a first embodiment, the invention includes one or more non-transitory computer-readable media storing computer-executable instructions that, when executed by a processor, perform a method for generating a document from a workflow, the method comprising creating, responsive to a workflow trigger, the document from a document template, wherein the document comprises a plurality of structured document sections and a plurality of unstructured document sections, receiving, from a first user of a group-based communication system, unstructured input into an unstructured document section of the plurality of unstructured document sections, saving, into the document, the unstructured input from the first user, receiving, from a second user of the group-based communication system, structured input into a structured document section of the plurality of structured document sections, performing a step of the workflow associated with the document based on the structured input into the structured document section, and saving a result of the workflow into the document.

In a second embodiment, the invention includes a method for generating a document from a workflow, the method comprising creating, responsive to a workflow trigger, the document from a document template, wherein the document comprises a plurality of structured document sections and a plurality of unstructured document sections, receiving, from a first user of a group-based communication system, unstructured input into an unstructured document section of the plurality of unstructured document sections, saving, into the document, the unstructured input from the first user, receiving, from a second user of the group-based communication system, structured input into a structured document section of the plurality of structured document sections, performing a step of the workflow associated with the document based on the structured input into the structured document section, and saving a result of the workflow into the document.

In a third embodiment, the invention includes a system comprising at least one processor and at least one non-transitory memory storing computer executable instructions that when executed by the processor cause the system to carry out actions for generating a document from a workflow comprising creating, responsive to a workflow trigger, the document from a document template, wherein the document comprises a plurality of structured document sections and a plurality of unstructured document sections, receiving, from a first user of a group-based communication system, unstructured input into an unstructured document section of the plurality of unstructured document sections, saving, into the document, the unstructured input from the first user, receiving, from a second user of the group-based communication system, structured input into a structured document section of the plurality of structured document sections, performing a step of the workflow associated with the document based on the structured input into the structured document section, and saving a result of the workflow into the document.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional email system. In some embodiments, the group-based communication system is a channel-based platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

In some embodiments, the group-based communication system may include synchronous multimedia collaboration sessions. Synchronous multimedia collaboration sessions may provide ambient, ad hoc multimedia collaboration in the group-based communication system. Users of the group-based communication system can quickly and easily join and leave these synchronous multimedia collaboration sessions at any time, without disrupting the synchronous multimedia collaboration session for other users. In some embodiments, synchronous multimedia collaboration sessions may be based around a particular topic, a particular channel, or a set of users, while in other embodiments, synchronous multimedia collaboration sessions may exist without being tied to any particular channel, topic or set of users. Synchronous multimedia collaboration sessions may be short, ephemeral sessions from which no data is persisted. Alternatively, in some embodiments, synchronous multimedia collaboration sessions may be recorded, transcribed, and/or summarized for later review. Members of a particular synchronous multimedia collaboration sessions can post messages within a messaging thread associated with that synchronous multimedia collaboration sessions that are visible to other members of that synchronous multimedia collaboration sessions together with other messages in that thread. The "multimedia" in a synchronous multimedia collaboration session may include any or all of audio, video, screen sharing, collaborative document editing, whiteboarding, co-programming or any other form of media. A synchronous multimedia collaboration session may be started for a particular channel or direct message conversation by one or more members of that channel or direct message conversation. For example, a user may start a synchronous multimedia collaboration session in a channel as a means of communicating with other members of that channel who are presently online. The user may have an urgent decision and want immediate verbal feedback from other members of the channel. Starting a synchronous multimedia collaboration session allows the user to start an immediate audio conversation with other members of the channel without requiring scheduling.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Figure 1:
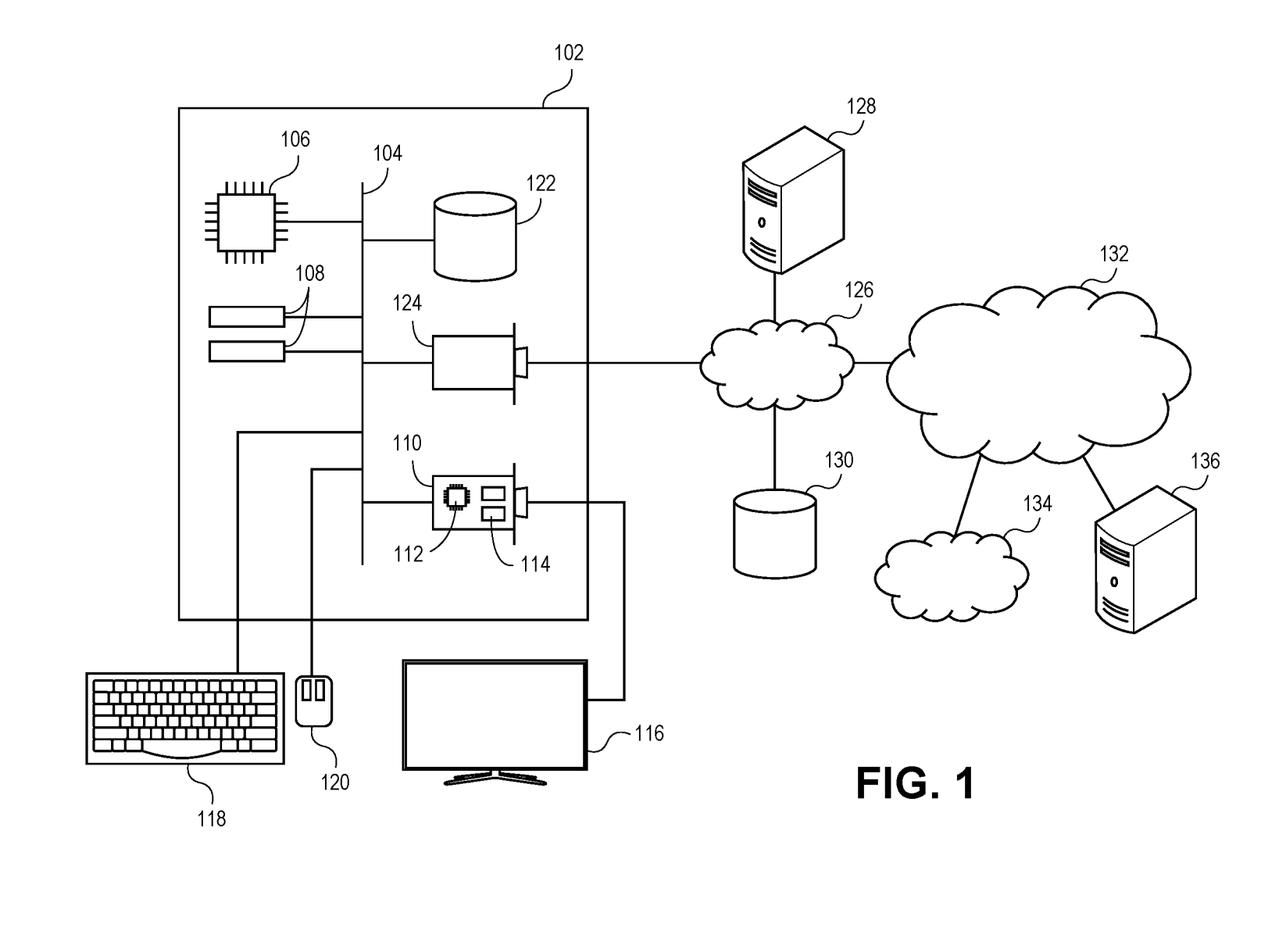
FIG. 1 depicts an exemplary hardware platform for certain embodiments of the invention.

FIG. 1 illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, BLUETOOTH, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
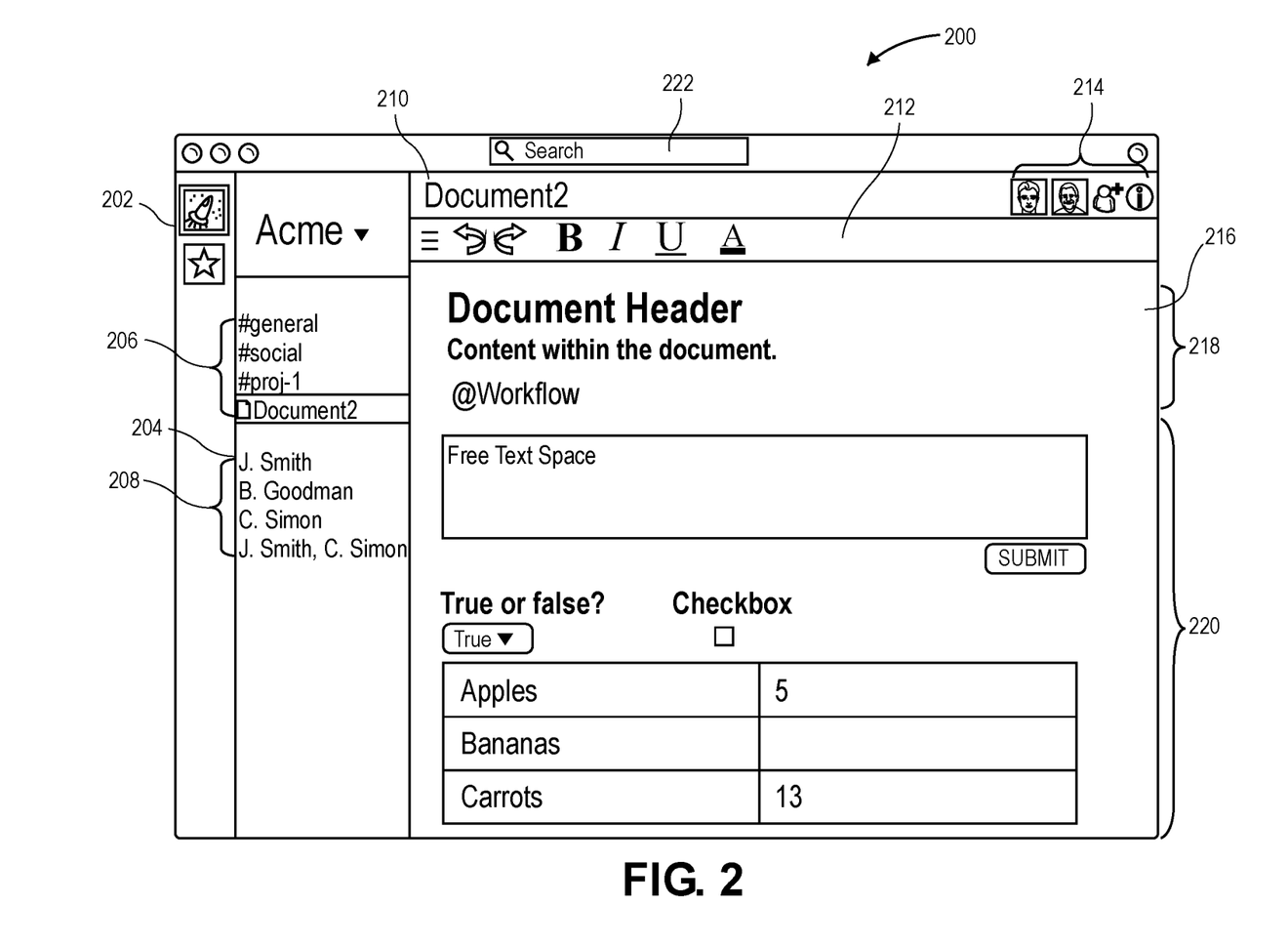
FIG. 2 depicts an exemplary embodiment of a user interface for the group-based communication system for carrying out embodiments of the invention and displaying a document.

FIG. 2 illustrates an exemplary embodiment of a user interface for the group-based communication system. Parent window 200 is depicted which comprises a plurality of panes. As depicted, parent window 200 comprises workspace pane 202; channel list pane 204, which comprises channel and document list 206 and direct message list 208; document pane 210, which comprises document toolbar 212, document controls 214, and document display 216. In some embodiments, users can interact with the panes to navigate and utilize the various functions available within the group-based communication system.

As depicted, parent window 200 includes workspace pane 202 for navigating between various workspaces in the group-based communication system. In some embodiments, the group-based communication system can be portioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. For example, a user may be a part of a workspace for a job at Acme Software Development. The user may also be a member of a local volunteer organization that also uses the group-based communication system to collaborate. To navigate between the two groups, the user may use workspace pane 202 to change from the Acme workspace to the volunteer organization workspace. A workspace may comprise one or more channels that are unique to that workspace and/or one or more channels that are shared between one or more workspaces. For example, the Acme company may have a workspace for Acme software development projects, a workspace for Human Resources, and an additional workspace for general company matters. In some embodiments, workspaces can be associated with one or more organizations or other entities associated with the group-based communication system.

As depicted, parent window 200 further comprises document pane 210 that comprises information related to the current displayed document. In some embodiments, within the group-based communication system, documents may be modified and edited by one or more users. Users with the appropriate permissions and access can view, edit, or comment on the documents. Document pane 210 may comprise document toolbar 212, document controls 214, and document display 216. Document display 216 may display all of the content within the document including unstructured sections 218 and structured sections 220. Channel list pane 204 may comprise a list of channels and documents to which the user has subscribed to or to which the user has been granted access or permissions to. Users can switch the currently displayed document to either another document, a channel, or a direct message by selecting another item in channel list pane 204.

In some embodiments, channel list pane 204 further includes direct message list 208. Direct message list 208 comprises a list of messages sent from a user directly to another user of the group-based communication system, called a direct message, and may be displayed in document pane 210 when selected. Direct messages may be sent to at least one other user. For example, the user may have a question for a manager, so the user may send a direct message to the manager asking the question. The manager may want to include another member of the group-based communication system in a response, so the manager may create a direct message group that includes the user and the other member of the group-based communication system. Direct messages may be sent to any number of users as multi-person direct messages. In some embodiments, direct messages can be sent to users within an organization, users outside of the organization, users of third party applications, and/or any variety of users.

Document pane 210 may include document toolbar 212, which may display icons and menus which allow for the formatting of a document. For example, document toolbar 212 may provide a user the ability to bold, italicize, or underline fonts. In some embodiments, document toolbar 212 may provide users the ability to undo and redo actions. In further embodiments, document toolbar 212 may allow a user to modify the color of text. In still further embodiments, document toolbar 212 may allow a user to insert images, tables, and/or workflows. Document pane 210 may also display metadata for the currently selected document, including document name. Document pane 210 may also include document controls 214 for viewing members with access to the document, inviting a new member to the document, viewing information about the document, or other document-related functions. For example, document controls 214 may display icons indicating which users are currently viewing the document. In some embodiments, document pane 210 may display a workflow status which indicates which workflow step the workflow is currently on. For example, a workflow status may show that the document is currently in the process of an approval workflow step and the document is awaiting approval from a specific user. In further embodiments, the workflow status may show a summary of information within the workflow document. For example, the workflow document may include a table for users to insert their shirt size, and the workflow status may include a summary of the number of shirts of each size that were entered into the table.

Parent window 200 may also include search pane 222. Search pane 222 may allow users to search for content located in the current workspace of the group-based communication system. In some embodiments, the content searched may include documents. For example, a user may be looking for text within a document the user had previously accessed. In other embodiments, a user may search for meta content within the document, such as the name of workflows, workflow steps, or workflow tags, or the name of a user who created the document. The user may not remember which document the text was in, so the user may search for the text in search pane 222. In some embodiments, a user may only be able to search for documents that a user has permission to view. For example, if a document was not previously shared with a user, the document may not show up in the search results. In further embodiments, a user may have access to the document generally, but not to one or more specific sections of a document. In this instance, the user may only search based on content within the document that the user has permission to access. Users are not limited to searching within documents and may also search for messages, channels, members, and the like.

Document display 216 may display the selected document. In some embodiments, a user of the group-based communication system may edit the document if they have sufficient permissions. In further embodiments, a user of the group-based communication system may leave comments on the document. Documents may be comprised of freeform unstructured sections 218 and workflow-related structured sections 220. In some embodiments, unstructured sections 218 may include areas of the document in which a user can freely modify the document without any constraints. For example, a user may be able to freely type text to explain the purpose of the document. In some embodiments, a user may add a workflow by typing the name of or at-mentioning (i.e., preceding the name of a workflow by the at symbol) the workflow. In further embodiments, typing the at sign or a previously selected symbol or a previously determined special character or symbol may provide the user with a list of workflows which the user can select to add to the document. For example, a user may realize that a marketing team may need to sign off on a proposal and type "!Marketing Approval" to initiate a workflow which culminates in a member of the marketing team approving the proposal. In some embodiments, tags other than "!" may be used instead or in addition. In some embodiments, structured sections 220 may include text entry, selection menus, tables, checkboxes, tasks, calendar events, or any other document section. In further embodiments, structured sections may include text entry spaces which are a part of a workflow. For example, a user may enter text into a text entry space detailing a reason for approval, and then select a submit button which will advance the workflow to the next step of the workflow. In some embodiments, the user may be able to add, edit, or remove structured sections of the document that make up the workflow components.

Figure 3:
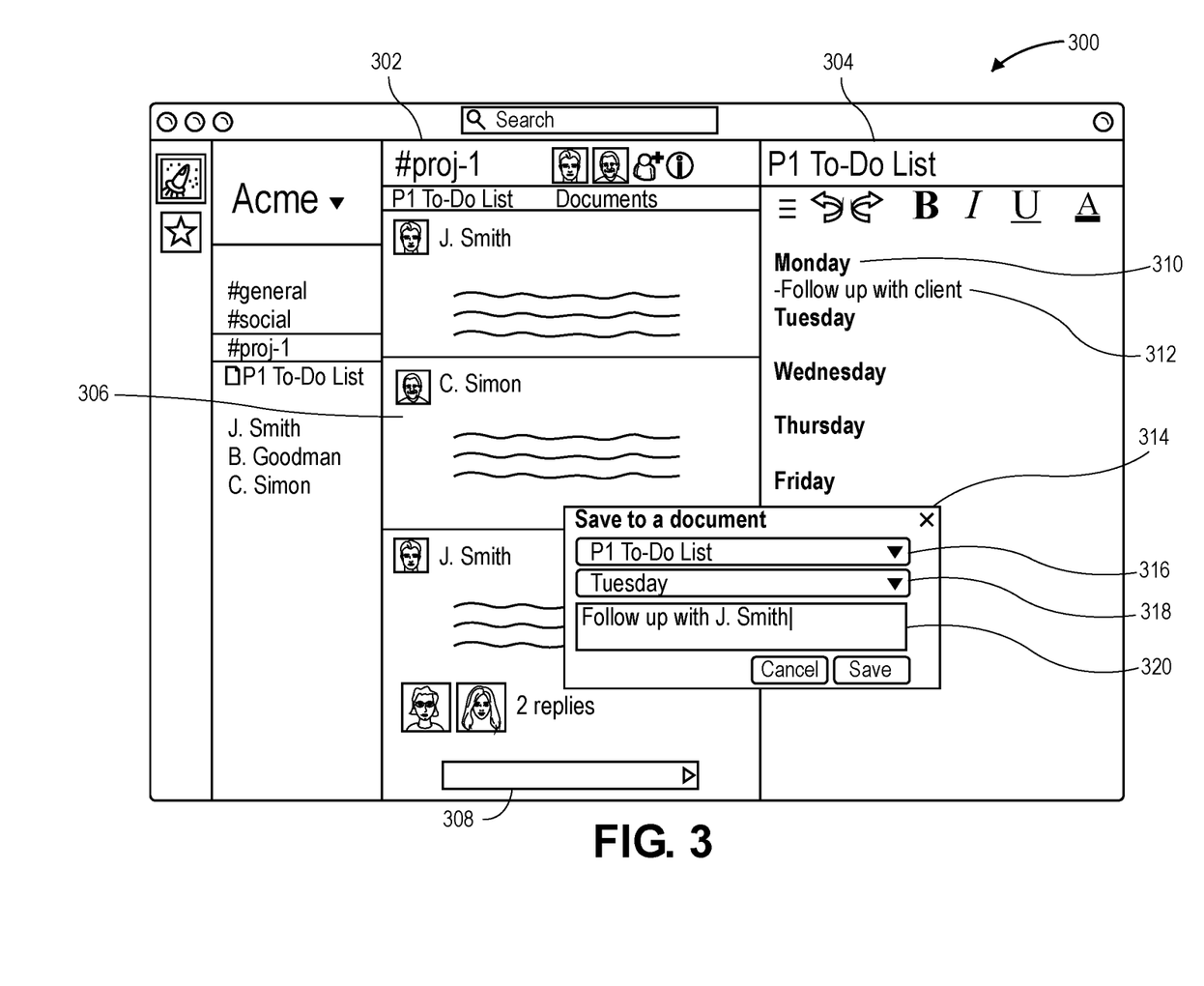
FIG. 3 depicts an exemplary embodiment of a user interface for the group-based communication system for carrying out embodiments of the invention and displaying a document and a channel simultaneously.

FIG. 3 illustrates an exemplary embodiment of a user interface for the group-based communication system. User interface 300 is depicted which comprises a plurality of panes. As depicted, user interface 300 comprises channel pane 302 and document pane 304. Channel pane 302 comprises information related to the currently displayed channel. As discussed above, in some embodiments, within the group-based communication system, communication may be organized into "channels," each channel dedicated to a particular topic or set of users. Members of a particular channel can post messages within that channel that are visible to other members of that channel together with other messages in that channel. Users may select a channel for viewing in order to see only those messages relevant to the topic of that channel without seeing messages posted in other channels on different topics. Channel pane 302 may further comprise channel messages 306 from users in the channel and compose pane 308 which allows users to send messages to the channel.

In some embodiments, either document pane 304 or channel pane 302 may be displayed independently, with only one pane appearing at a time. In further embodiments, document pane 304 may appear alongside channel pane 302. Channel pane 302 may include a link to a document which may be related to the channel, and upon a user selecting the document, document pane 304 may appear next to channel pane 302 within user interface 300. For example, a workspace may have a channel for a new product which is set to release in the future. The channel might contain a document with a marketing plan related to that product which is accessible from the channel.

In some embodiments, a document may contain section headers 310. In some embodiment, section headers may be added by document editors using markup language or dedicated controls such as those in document toolbar 212. Section headers 310 may be referenced by one or more workflows. In some embodiments, section headers 310 may be used to place content within a document. For example, a workflow document may be a list of tasks for a user. A workflow may place content under section header 310 indicating the day of the week at which the task may occur. In further embodiments, section headers 310 may be used to trigger workflows, with certain content in the document corresponding to section headers 310 being used within a step within the workflow. For example, a workflow document may have section headers 310 indicating the days of the week and a user placing content under a particular day may trigger a workflow to schedule a calendar event for that day related to the content.

In some embodiments, the content within a document may be an entity 312. Entity 312 may be any object within the group-based messaging system such as a channel message 306, a direct message, or a document. Entity 312 may appear within the document as a hyperlink which when selected by a user allows the user to navigate to entity 312. For example, selecting the hyperlink for a message may take the user to the channel and display where the message was located in the conversation, providing further context for the message to the user. In some embodiments, entity 312 may be inserted by the user into a workflow document. A user may wish to add channel message 306 into a document. The user may select an icon or toolbar within channel message 306 to launch dialog box 314. Dialog box 314 may contain document selector 316 which allows the user to select a workflow document to save channel message 306 into. In some embodiments, document selector 316 may be sorted based on which workflow documents the user has recently interacted with. Dialog box 314 may also contain document section selector 318. In some embodiments, document section selector 318 may be populated with section headers 310 from the workflow document selected in document selector 316. Dialog box 314 may also contain document hyperlink text box 320 which allows the user to input text which will be displayed within the workflow document. For example, a user may want to add a specific channel message 306 into a workflow document which acts as a task list to do on Tuesday. The user may select channel message 306 to launch dialog box 314, select the task list workflow document in document selector 316, select Tuesday in document section selector 318, and input a note regarding the channel message in document hyperlink text box 320. The note will then appear under the "Tuesday" section header 310 within the selected workflow document and act as a hyperlink to channel message 306.

Figure 4:
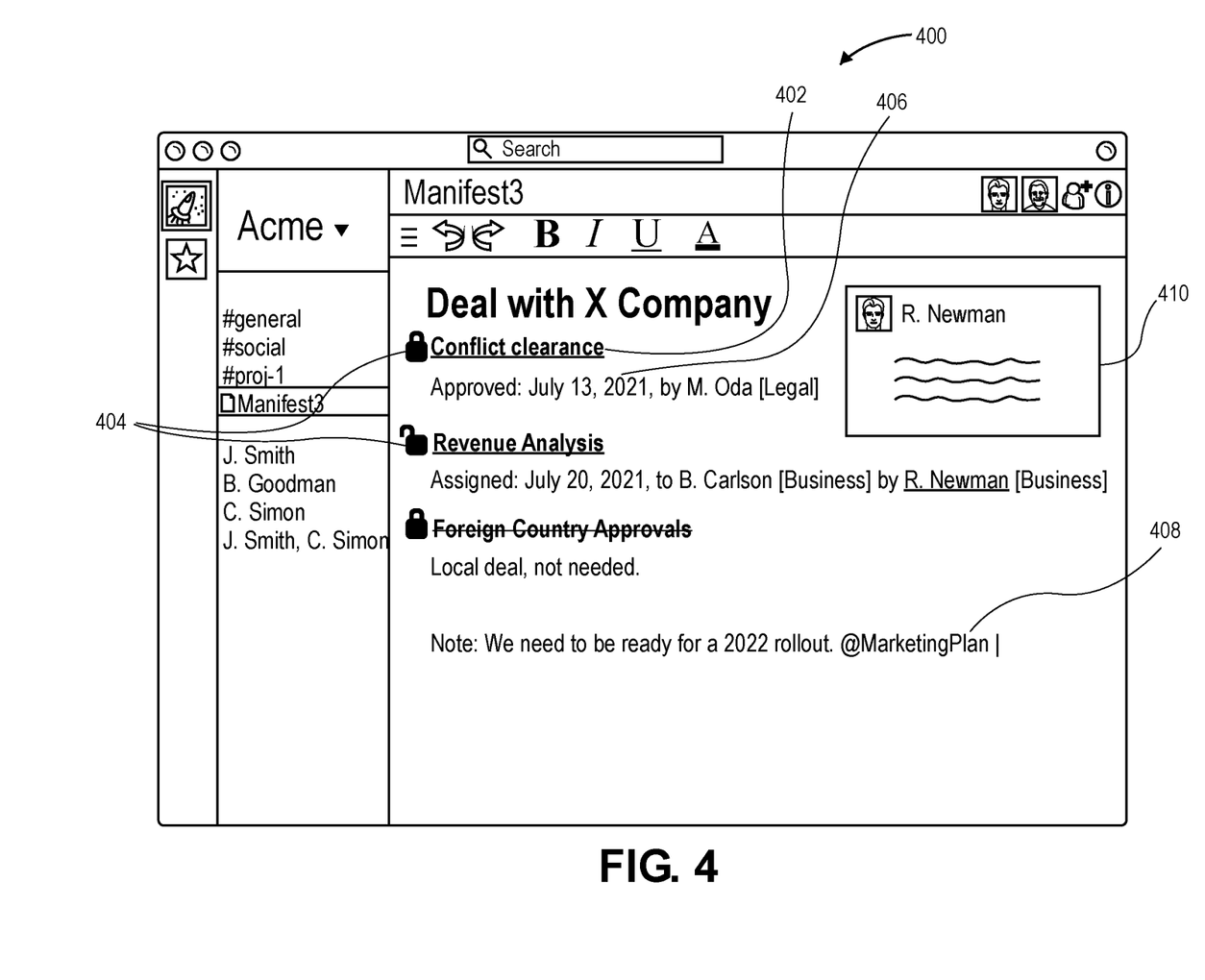
FIG. 4 depicts an exemplary embodiment of a user interface for the group-based communication system for carrying out embodiments of the invention and saving workflow information into a document.

FIG. 4 illustrates an exemplary embodiment of a user interface for the group-based communication system. Graphical user interface (GUI) 400 is depicted as displaying a workflow document. In some embodiments, a workflow document may be based on a workflow document template. A workflow document template may be created which has certain sections and related workflows configured to accomplish some task. In some embodiments, a workflow document template may allow a user to create a new workflow document more efficiently by pre-populating the workflow document based on the workflow document template. For example, a workflow document template may exist for a deal between two companies as a deal template. This deal template may include workflow steps such as conflict clearance, revenue analysis, cost analysis, and/or specific foreign country approvals. A user wishing to create a new workflow document for a deal may select the deal template to automatically include these sections and their associated workflows into the new workflow document.

In some embodiments, a workflow document may have one or more workflow tags 402 which correspond to a workflow or step within a workflow. Workflow tags 402 may be associated with a variable name which can be referenced within a workflow. Workflow tags 402 may also be associated with a section within a workflow document which may be programmatically populated by a workflow. For example, workflow tag 402 may be associated with a workflow step requiring a company's legal department to establish that a potential deal does not have any legal conflicts. In this example, once the legal department approves the transaction, workflow step record 406 may be saved within the workflow document. Workflow step record 406 may include the result of the workflow step, a timestamp associated with the workflow step, and information regarding a user associated with the workflow step including the user's name, title, or department. For example, the workflow step record

406 may indicate that the conflict clearance was approved by a specific user from legal on a specific date. In some embodiments, workflow step record 406 may include additional information regarding the workflow step including multiple users. For example, a first user may assign a second user to a task within a workflow step, and this information may be recorded and displayed within workflow step record 406.

Sections within a workflow document may be locked or unlocked by either a workflow or a user with appropriate permissions to the workflow document. In some embodiments, lock status 404 may be an icon associated with one or more sections of a workflow document indicating whether or not a particular section is locked or unlocked. A locked section may prevent certain users from modifying that section. For example, once a decision is made a user may wish to make a note of that decision in a section and lock the section so the decision cannot later be changed. In some embodiments, a locked section may only be updated by a workflow. In further embodiments, lock status 404 may record a history of changes to lock status 404 comprising information related to what caused lock status 404 to change including what caused the change to occur and when the change occurred.

In some embodiments, workflow tags 402 may be deleted to skip either steps in a workflow or a workflow entirely. For example, a user with appropriate document editing permissions may delete workflow tag 402 associated with a foreign country approval within a larger deal workflow because the deal does not involve a foreign country. This allows for the workflow document to skip unnecessary steps without requiring a difficult or cumbersome workaround. In some embodiments, workflow tag 402 may show the text formatted with a strikethrough to indicate that workflow tag 402 was deleted. In other embodiments, workflow tag 402 may be changed to a different color to indicate that it was deleted. In still other embodiments, workflow tag 402 may be removed from the document entirely when it is removed.

In some embodiments, a workflow may be triggered by a user typing workflow command 408 within a document. Workflow command 408 may be used to add additional workflows or workflow steps into an existing workflow document. This allows a user to automatically add existing workflows which may interact with other users or documents within the group-based communication system. In some embodiments, workflow command 408 may be initiated by typing the "@" symbol followed by the name of a workflow. Typing the "!" or "@" symbol may provide the user with a list of available workflows for the user to select. In some embodiments, the list of available workflows may be used to autocomplete a partial name of a workflow based on what the user has typed.

In some embodiments, workflow documents may permit users to leave comments 410 within the workflow documents. Permissions may be granted for users to view and/or leave comments 410 within individual workflow documents. In some embodiments, the display of comments 410 may be toggled on or off by users. Comments 410 may be displayed as a pane that persists over the workflow document or as a separate pane showing all comments 410 together. In some embodiments, an indicator will be visible within a workflow document indicating that one or more comments 410 exist. In further embodiments, the indicator may specify certain text or images which correspond to comment 410.

Figure 5:
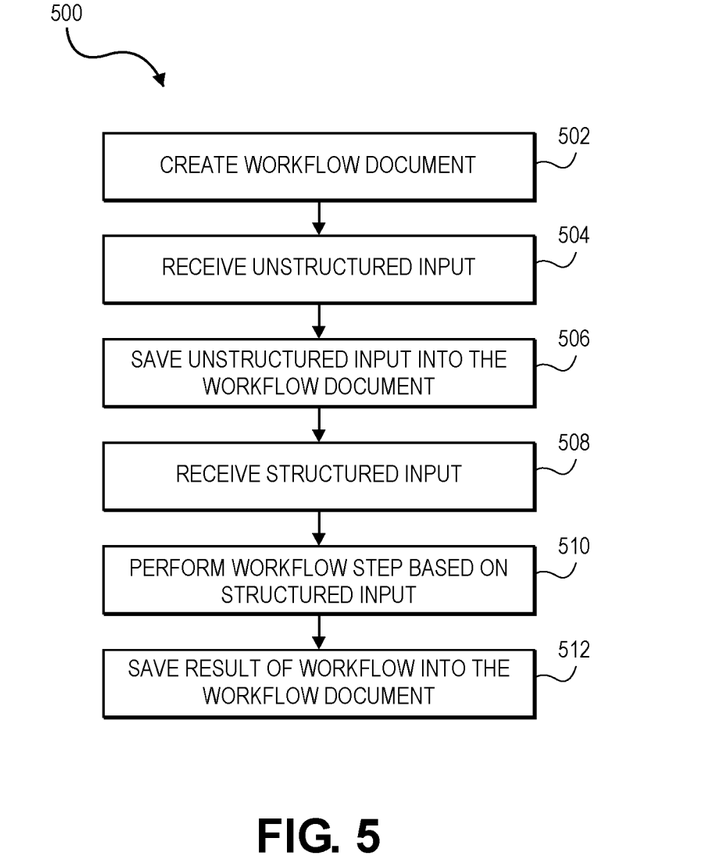
FIG. 5 depicts an exemplary flowchart for illustrating the operation of a method in accordance with one embodiment of the invention for populating a workflow document.

FIG. 5 depicts an exemplary flow chart illustrating the operation of a method 500 of populating a workflow document. In some embodiments, method 500 enables a workflow document to be populated within a group-based communication system. At step 502, a workflow document is created. A workflow document may be created manually by a user or created automatically as part of a workflow based on a workflow trigger. For example, during an onboarding process for new hires at a company, there may exist an onboarding workflow. The onboarding workflow may automatically generate a workflow document containing information regarding the onboarding process or an offer letter if the workflow determines that an offer should be made. The workflow may automatically create a new workflow document designed to determine the appropriate compensation for the new hire. In some embodiments, a workflow document may be created in association with a channel, direct message, or any virtual space. For example, a user may create a project document within a channel for a project. The project document may be automatically shared with all users within the project channel such that the users within the project channel have permission to access the document. In further embodiments, a workflow document may be created based on a workflow document template. A workflow document template may contain one or more predetermined sections which may be either structured or unstructured. For example, a workflow document template may exist for deals at a company, as depicted in FIG. 4. Such a workflow document template may contain multiple sections which are typically used for deals at the company which creates a starting point for any new deals for the company, allowing a new workflow document to incorporate existing workflows. The workflow document template may contain certain structured sections or specific words or phrases which are used in workflows. In some embodiments, a workflow document template may be inserted into a workflow document after the workflow document is created.

Next, at step 504, unstructured input is received. Unstructured input is input which is not directly associated with any workflow. In some embodiments, unstructured input may be received in the form of text input into the workflow document from a user of the group-based communication system. For example, a user may type notes into the workflow document related to a meeting they had regarding a topic associated with the workflow document. A workflow document may have one or more unstructured sections which allow users with the appropriate permissions to freely input text, images, multimedia, and other content.

Next, at step 506, the unstructured input is saved or otherwise persisted into the workflow document. Once saved, the unstructured input may be visible to other users who have the appropriate permission to view the document, or by the entering user after they leave and re-enter the document. In some embodiments, the unstructured input will be saved after a user chooses to save the unstructured input. In further embodiments, the unstructured input will be saved in real time as the user types into the workflow document, allowing viewing users to see changes in real time, and to collaboratively edit the document. Additional changes to the unstructured input, either formatting or content, may also be saved either continuously or when saved manually by a user.

Next, at step 508, structured input is received. Structured input is an input which is associated with a workflow. In some embodiments, structured input may be associated with one or more structured sections or structured content items. Structured input may be directly associated with a variable name which can be used to reference the structured input. In some embodiments, the structured input may be received in response to a message or communication sent to a user of the group-based communication system. For example, a user may receive a message asking for the user's opinion about a particular candidate for a recruitment workflow. In some embodiments, a structured input may be in response to structured content within a workflow document such as a selection list, a check box, a radio box, or a table. For example, a workflow document for a new hire may have a check box for whether or not the new hire is starting remotely. In some embodiments, both the structured and unstructured inputs may be received from the same user. In other embodiments, different users may provide different inputs. In further embodiments, structured sections may be spreadsheets which can allow users to not just input data but to filter and edit existing data.

Next, at step 510, a workflow step is performed based on the structured input. For example, in a workflow document for a new hire if a box is checked indicating that the new hire is starting remotely, the workflow document may automatically trigger a new workflow with specific steps for onboarding the new hire remotely, such as the process of mailing the new hire a laptop. In some embodiments, the workflow step may send a message or request to a user of the group-based communication system. In further embodiments, the workflow step may assign one or more users certain permissions for the workflow document. For example, the workflow step may involve sharing the document with a legal department for approval and the workflow step may grant viewing permissions to all members associated with the legal department within the group-based communication system. In some embodiments, a workflow step may involve posting messages into specified channels. For example, in the example above, a message may be posted in the channel associated with the legal department to notify channel members that the document is awaiting approval. A workflow step may take any action within the group-based communication system such as creating or deleting a channel, modifying permissions for one or more users, or sending a message to one or more users or one or more channels. In some embodiments, a workflow step may interact with an external system, platform or document. The external system, platform, or document may be hosted by a third party or integrated into the group-based communication system. For example, a workflow step may trigger an email. As another example, a workflow step may take an action on a document that is part of an external system, such as inserting content into the external document. Such inserted content may be imported from an office document or spreadsheet. As yet another example, a workflow step may interact with an external platform and take some action such as messaging a user of the external platform or triggering a workflow associated with the external platform. In some examples, a workflow may receive input through a form from a communication channel and integrate with a workflow document such that the data received by the form is outputted to the document. In some examples, the workflow may receive input from an external application and output the received data to the document. In some examples, data received from a workflow triggered from the document may be output to a communication channel of a group-based communication system. As still another example, input, imported or generated content may be exported or stored in a typed or untyped table.

Finally, at step 512, the result of the workflow is saved into the workflow document or otherwise persisted. The result of the workflow may be saved in a structured section within the workflow document. Alternatively, a new document may be created with the results of the workflow. In some embodiments, the result of the workflow may be an approval block indicating whether or not the structured input was approved or disapproved by another user. For example, the structured input may be a request for a reimbursement of a business expense from a user. The request may be forwarded to a user in accounting who may then approve the reimbursement. The result of the approval may then be saved in the workflow document. In some embodiments, information regarding the time of approval and the user who approved the workflow step may be stored in the workflow document. In some embodiments, the result of the workflow may be stored in the workflow document such that it cannot be later modified. In some embodiments, a digital signature of the approving user may be included to verify the approval. In further embodiments, the result of the workflow may be modified and any changes to the result may be tracked within the workflow document such that a user with viewing permissions can see the history of changes. In still further embodiments, the result of one or more workflows may be saved into the workflow document such that the workflow document can act as a manifest for the one or more workflows.

In some further embodiments, saving the result of the workflow into the workflow document may trigger a supplemental workflow or another workflow step. Saving the result of the workflow into the document may finalize the document for one group of users and initiate a workflow for a second group of users. For example, if the workflow document is a press release, the public relations group may finalize a press release workflow document. A workflow may automatically send the finalized press release workflow document to one or more translation groups to translate the press release into multiple other languages. Either afterwards or in tandem, another workflow process may be initiated to send the press release to a graphic design group so that any graphics within the press release workflow document can be added or tweaked as necessary, or so that any photos can be appropriately finalized such that all appropriate copyright licenses are obtained. In some embodiments, the press release team may include placeholders in the press release workflow document such that the graphic design team will know to select a graphic once the workflow passes the press release workflow document to the graphic design team.

Figure 6:
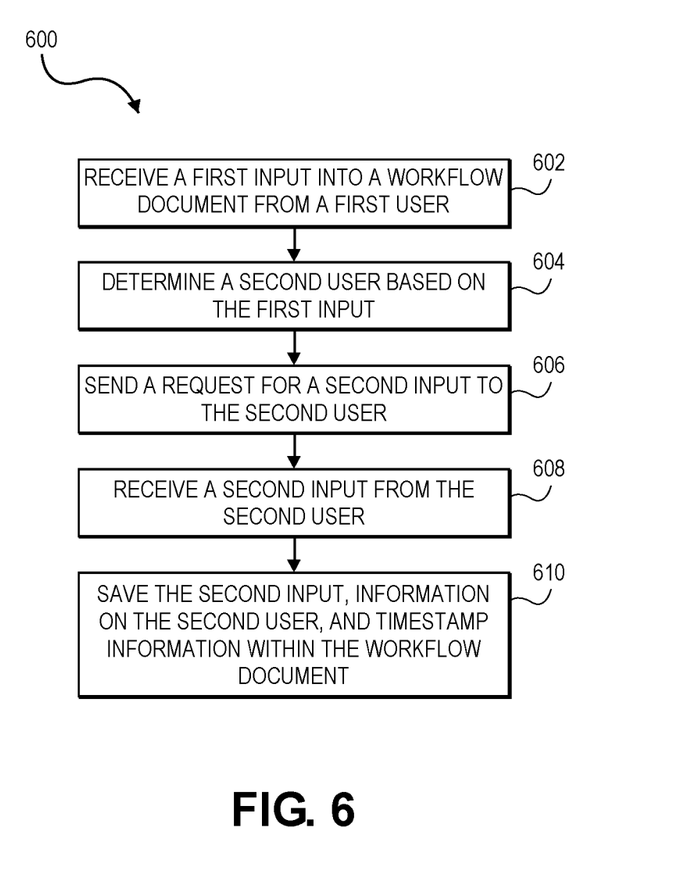
FIG. 6 depicts an exemplary flowchart illustrating the operation of a method in accordance with one embodiment of the invention for using a workflow to populate a workflow document.

FIG. 6 depicts an exemplary flow chart illustrating the operation of a method 600 of populating a workflow document via workflows. In some embodiments, method 600 enables a workflow document to be populated within a group-based communication system by sending requests to users within the group-based communication system. At step 602, a first input from a first user is received into a workflow document. The first input may be a structured input. For example, in a recruitment workflow, the first input may be the username of a user who will be scheduled to interview a candidate. In some embodiments, the first input corresponds to a step in a workflow. For example, the first input may be a user approving a step in the workflow such that the workflow may continue, such as a manager approving an expense request.

Next, at step 604, a second user is determined based on the first input. In some embodiments, the first input will directly correspond to the second user. For example, the first user may select the second user from a list of users as the first input. In further embodiments, the second user may be determined based on the first input being entered and the workflow determining the next step of the workflow should occur. For example, in a deal workflow, the first input may be a legal team approving the deal. The next step of the workflow may be to send a request to an analyst to calculate the potential profit from the deal, and the workflow will then determine that the analyst should be the second user. In some embodiments, the second user may be a user from a different channel, group, or workspace than the first user.

Next, at step 606, a request for a second input is sent to the second user. In some embodiments, the request may be in the form of a message within the group-based communication system. The request may include a prompt to the second user to inform the second user what the second input should be. In some embodiments, the request may be a form which specifies a specific type of input request for the second user to enter and implements data validation techniques. For example, the request may require the second input be a number, such as the amount spent to be used in a reimbursement workflow, and prevent the second user from submitting non-numeric inputs. In further embodiments, the request may be an approval request asking the second user to approve an action. For example, within a reimbursement workflow the request may be sent to a manager to approve a previously submitted expense reimbursement request, and the second input may be the manager selecting either a "approve" or "deny" button within a request prompt. In further embodiments, the request may be sent to a third party application.

Next, at step 608, a second input is received from the second user. In some embodiments, the second input may be formatted upon receipt. For example, if the second input was the second user approving a request, the input may be formatted such that it contains additional information about the approval. In some embodiments, the second input may trigger an additional workflow upon receipt. For example, if the second input is a request for a significant amount of money to be reimbursed, a workflow may trigger to escalate the approval process to a different user. In further embodiments, the second input may conditionally trigger an additional workflow based on the time between the second user being sent the request and the time the second input was received. Such a workflow trigger may be used in workflows which have time sensitive aspects.

Finally, at step 610, the second input is saved into the workflow document along with information about the second user and timestamp information. In some embodiments, the specifics of when the input was received and who the input was received from are significant and a company may wish to permanently retain that information. For example, a company may want to know exactly when certain marketing campaigns were officially approved and who it was that approved them. This allows the company to properly allocate praise to the right person and accurately measure how long it took the company between approval and execution. In some embodiments, the second input may be locked after it is saved into the workflow so that it cannot be later modified.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by at least one processor, perform a method for generating a workflow document, the method comprising:
    creating, responsive to detecting a workflow trigger and based at least in part on data and context obtained from the workflow trigger, the workflow document comprising a plurality of structured document sections and a plurality of unstructured document sections from a document template,
    wherein the workflow document is collaboratively editable and may be modified by a plurality of users of a group-based communication system comprising a plurality of group-based communication channels;
    causing display of the workflow document in a first group-based communication channel of the plurality of group-based communication channels;
    receiving, from a first user of the plurality of users, unstructured input into an unstructured document section of the plurality of unstructured document sections;
    saving, into the workflow document, the unstructured input from the first user;
    receiving, from the first user, a first structured input into a first structured document section of the plurality of structured document sections;
    responsive to detecting the first structured input from the first user, performing a first workflow of a plurality of workflows;
    saving a first result of the first workflow into the workflow document such that the first result of the first workflow is visible to the plurality of users in real time;
    receiving, from a second user of the plurality of users, a second structured input into the first structured document section, wherein the second structured input is associated with the first result of the first workflow;
    responsive to detecting the second structured input from the second user, performing a second workflow of the plurality of workflows and locking a first portion of the workflow document from additional modifications by the plurality of users of the group-based communication system while a second portion of the workflow document remains unlocked; and
    saving a second result of the second workflow into the workflow document such that the second result of the second workflow is visible to the plurality of users in real time.

2. The one or more non-transitory computer-readable media of claim 1, wherein the workflow document includes a supplemental workflow trigger which initiates a supplemental workflow.

3. The one or more non-transitory computer-readable media of claim 1, wherein the second result of the second workflow comprises information related to a workflow user and a timestamp associated with the second workflow.

4. The one or more non-transitory computer-readable media of claim 1, wherein the method further comprises:
    saving the second result of the second workflow into a the first group-based communication channel.

5. The one or more non-transitory computer-readable media of claim 1, wherein the first portion of the workflow document is unlocked in response to the second workflow.

6. The one or more non-transitory computer-readable media of claim 1, wherein the method further comprises:
   sending, to a third user of the plurality of users, a request for an additional input based on the second workflow.

7. The one or more non-transitory computer-readable media of claim 1, wherein the method further comprises:
   receiving application data from an application;
   performing a further step of the second workflow associated with the workflow document based on the application data received from the application; and
   saving the second result based on the second workflow and the application data into the workflow document.

8. A method for generating a workflow document, the method comprising:
   creating, responsive to detecting a workflow trigger and based at least in part on data and context obtained from the workflow trigger, the workflow document comprising a plurality of structured document sections and a plurality of unstructured document sections from a document template,
   wherein the workflow document is collaboratively editable and may be modified by a plurality of users of a group-based communication system comprising a plurality of group-based communication channels;
   causing display of the workflow document in a first group-based communication channel of the plurality of group-based communication channels;
   receiving, from a first user of the plurality of users, unstructured input into an unstructured document section of the plurality of unstructured document sections;
   saving, into the workflow document, the unstructured input from the first user;
   receiving, from the first user, a first structured input into a first structured document section of the plurality of structured document sections;
   responsive to detecting the first structured input from the first user, performing a first workflow of a plurality of workflows;
   saving a first result of the first workflow into the workflow document such that the first result of the first workflow is visible to the plurality of users in real time;
   receiving, from a second user of the plurality of users, a second structured input into the first structured document section, wherein the second structured input is associated with the first result of the first workflow;
   responsive to detecting the second structured input from the second user, performing a second workflow of the plurality of workflows and locking a first portion of the workflow document from additional modifications by the plurality of users of the group-based communication system while a second portion of the workflow document remains unlocked; and
   saving a second result of the second workflow into the workflow document such that the second result of the second workflow is visible to the plurality of users in real time.

9. The method of claim 8, wherein the workflow document includes a supplemental workflow trigger which initiates a supplemental workflow.

10. The method of claim 8, wherein the second result of the second workflow comprises information related to a workflow user and a timestamp associated with the second workflow.

11. The method of claim 8, wherein the method further comprises:
   saving the second result of the second workflow into the first group-based communication channel.

12. The method of claim 8, wherein the first portion of the workflow document is unlocked in response to the second workflow.

13. The method of claim 8, wherein the method further comprises:
   sending, to a third user of the plurality of users, a request for an additional input based on the second workflow.

14. The method of claim 8, wherein the method further comprises:
   receiving application data from an application;
   performing a further step of the second workflow associated with the workflow document based on the application data received from the application; and
   saving the second result based on the second workflow and the application data into the workflow document.

15. A system comprising at least one processor and at least one non-transitory memory storing computer executable instructions that when executed by the at least one processor cause the system to carry out actions for generating a workflow document comprising:
   creating, responsive to detecting a workflow trigger and based at least in part on data and context obtained from the workflow trigger, the workflow document comprising a plurality of structured document sections and a plurality of unstructured document sections from a document template,
   wherein the workflow document is collaboratively editable and may be modified by a plurality of users of a group-based communication system comprising a plurality of group-based communication channels;
   causing display of the workflow document in a first group-based communication channel of the plurality of group-based communication channels;
   receiving, from a first user of the plurality of users, unstructured input into an unstructured document section of the plurality of unstructured document sections;
   saving, into the workflow document, the unstructured input from the first user;
   receiving, from the first user, a first structured input into a first structured document section of the plurality of structured document sections;
   responsive to detecting the first structured input from the first user, performing a first workflow of a plurality of workflows;
   saving a first result of the first workflow into the workflow document such that the first result of the first workflow is visible to the plurality of users in real time;
   receiving, from a second user of the plurality of users, a second structured input into the first structured document section, wherein the second structured input is associated with the first result of the first workflow;
   responsive to detecting the second structured input from the second user, performing a second workflow of the plurality of workflows and locking a first portion of the workflow document from additional modifications by the plurality of users of the group-based communication system while a second portion of the workflow document remains unlocked; and
   saving a second result of the second workflow into the workflow document such that the second result of the second workflow is visible to the plurality of users in real time.

16. The system of claim 15, wherein the workflow document includes a supplemental workflow trigger which initiates a supplemental workflow.

17. The system of claim 15, wherein the second result of the second workflow comprises information related to a workflow user and a timestamp associated with the second workflow.

18. The system of claim 15, wherein the actions further comprise:
   saving the second result of the second workflow into the first group-based communication channel.

19. The system of claim 15, wherein the first portion of the workflow document is unlocked in response to the second workflow.

20. The system of claim 15, wherein the actions further comprise:
   sending, to a third user of the plurality of users, a request for an additional input based on the second workflow.

* * * * *